June 6, 1967 K. W. JOHNSON 3,323,764
SHOCK AND VIBRATION MOUNT
Filed March 3, 1965

INVENTOR.
KENNETH W. JOHNSON
BY
ATTORNEY

United States Patent Office 3,323,764
Patented June 6, 1967

3,323,764
SHOCK AND VIBRATION MOUNT
Kenneth W. Johnson, Jamestown, Ohio, assignor, by mesne assignments, to Barry Wright Corporation, Watertown, Mass., a corporation of Massachusetts
Filed Mar. 3, 1965, Ser. No. 436,834
16 Claims. (Cl. 248—21)

The present invention relates to protective means and, more particularly, to improved devices for isolating and protecting other devices from harmful and sometimes destructive effects of vibratory and/or shock forces to which such other devices may be subjected.

Unit type isolators are presently available which are generally effective to afford some degree of protection for other devices against vibratory forces or shock forces. However, the factors that influence the design of such devices are quite different in the case of units intended to protect against vibratory forces from those which govern if protection is desired from shock forces. Generally speaking, and as used herein, the term "shock" denotes suddenness, either in the application of a force or in the inception of a motion.

The primary function of a shock absorber or isolator is to provide a means whereby a device is protected against impact or instantaneous loads being transmitted from a base or frame of a second device or machine on which the first device may be mounted. Protection against shock forces or shock isolation is usually accomplished by storing energy within a resilient medium and then releasing such energy at a relatively slow rate. Generally, such devices comprise a rubber spring which, together with the mass of the mechanism which it supports, has a natural frequency that is sufficiently different from that of the disturbing force as to bring about a minimum amplitude of vibration of the supported mechanism, and yet has sufficient static load-carrying capacity to support the load of such mechanism. Hence, a given shock absorber or isolator may be effective in a case where the mechanism is to be subjected to a relatively high magnitude of loading within a short time interval, for example, 0.001 second or less, and yet may tend to magnify the shock where the mechanism is to be subjected to a loading of considerably smaller magnitude but with a longer time interval.

As used herein, the term "vibration' 'is used to describe a continuing periodic change in the magnitude of a displacement with respect to a specified central reference point. Also, as used herein, the term "mechanical vibration' 'is used to describe the continuing periodic motion of a solid body at any frequency. In most cases, mechanical vibration may be isolated by placing a resilient medium between the source of vibration and its surrounding area to reduce the magnitude of the force transmitted from a structure to its support or, alternatively, to reduce the magnitude of motion transmitted from a vibrating support to the structure. One of the prime considerations in the isolation of vibration is the proper use of isolating means under various load configurations with respect to the loading of such isolator means, the desired natural frequency, the position and location of the isolating means, and the relationship of the structural response of equipment to which such means are attached.

It can be shown that for vibration isolation means to be effective, the natural frequency thereof should be approximately 40% of the frequency of the disturbing source. Those skilled in the art will recognize that the natural frequency is the frequency at which a freely vibrating mass system will oscillate once it has been disturbed. There are many instances where equipment must operate over a fairly wide frequency range, for example, as in aircraft where vibrations may occur in the range from 5 to in excess of 2000 cycles per second. In many instances, the equipment will thus be subjected to lower frequencies initially; will pass through a condition known as resonance or resonant frequency; and may be designed for normal operation at a frequency which is considerably higher than the resonant frequency. As used herein, resonance exists when the natural frequency of a vibration isolator means coincides with the frequency of the disturbing vibratory forces; and resonant frequency means that frequency at which such coincidence occurs.

A condition of resonance causes magnification of the disturbing vibratory forces and may be harmful, and sometimes destructive, to equipment subjected to such forces unless proper controls can be effected. To provide such controls, the resilient medium of a vibration isolation means must be provided with suitable damping. While vibration dampening is helpful under conditions of resonance, it may be detrimental in many instances to a system at frequencies above the resonant frequency.

Thus, it is apparent that the principal factors influencing the design of a shock or a vibration type of isolator will often lead to differing conclusions depending upon what type of protection is desired. Accordingly, present unit type isolators are generally effective within their intended range of operation for either vibration or shock absorption, but will provide only limited ability or no ability to absorb both shock and vibration. This is especially true when the design conditions require a natural frequency of the isolation unit in the 4 to 10 cycles per second range for proper vibration absorption, and at the same time the resilient medium or cushion for absorbing the shock energy requires a relatively high spring rate or gradient, and at the same time it is required to provide effective dampening in the vertical and horizontal directions during the vibration phase of the environment in which the isolator unit is to be installed.

Accordingly, it is an object of the present invention to provide means for obviating the above difficulties.

Another object of the invention is to provide a unit type of isolator that is effective in reducing vibration and shock forces within its designed frequency range.

A further object is in the provision of a unit type isolator that is self-contained and requires no other structural members for its operation.

Still another object is in the provision of a unit type isolator that is readily adaptable to a wide range of different frequency responses merely by changing or selecting the desired spring rate of the load carrying spring.

A further object is in the provision of a unit type isolator that is readily adaptable for use within a designed rate of shock forces of varying intensities merely by the proper selection of the gradient or load-deflection rate of the resilient cushion member thereof.

Still another object is in the provision of the unit type isolator capable of providing independent damping in the vertical and horizontal directions.

A further object of the invention is to provide a device of the character set forth which is mechanically simple in construction, inexpensive to manufacture, is effective and efficient in use, and yet is readily modified through selection and replacement of one or more of the components thereof in order to provide a device that is effective over a wide range of operating conditions for absorbing vibration and/or shock impulses.

These and other objects of the invention will become apparent from the following description taken in conjunction with the accompanying drawings in which.

Figure 2:
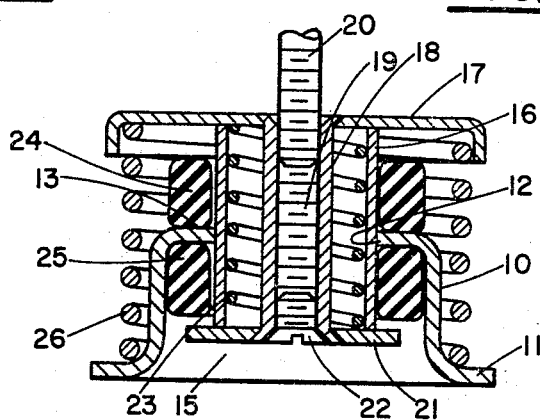
FIGURE 2 is a somewhat enlarged sectional view of the isolation device illustrated in FIGURE 1.

Referring to the drawings and particularly to FIGURE 2, there is illustrated therein an isolation unit comprising a hollow cup-shaped member 10 having a mounting base 11 and having an opening 12 provided in the central portion of the top horizontally extending portion 13 of the casing member 10. A plurality of screw or bolt-receiving openings arep rovided in base 11 to facilitate mounting of the isolator unit. The unit generally is designated at 15.

A split cylindrical or sleeve spring 18 is received within opening 12. For reasons which will become apparent as the description proceeds, the outside diameter of spring 16 is somewhat greater than the diameter of opening 12. A cap 17 of relatively shallow cup-shape and having a downwardly projecting member 18 affixed thereto rests upon the upper end of spring 16 with downwardly projecting member 18 projecting downwardly through the central portion of cylindrical spring 16. Member 18 is provided with a hollow central portion having thread means 19 for threadedly engaging a mounting bolt 20. Cylindrical spring 16 is held against cap member 17 by means of a washer 21 which bears against the lower end portion of spring 16 and is secured by a screw 22 in threaded engagement with threads 19. A compression spring 23 is interposed between the internal surfaces of cylindrical spring 16 and the exterior surface of downwardly projecting member 18. Generally, the length of spring 23 will be somewhat greater than the length of the cylindrical spring 16 so that spring 23 is a pre-loaded spring. Those skilled in the art will appreciate that through proper choice of the length of spring 23 and/or the insertion of washers or spacers between the ends of spring 23 and/or washer 21 and/or cap 17, the magnitude of the pre-loading force of spring 23 can be varied as desired.

Figure 1:
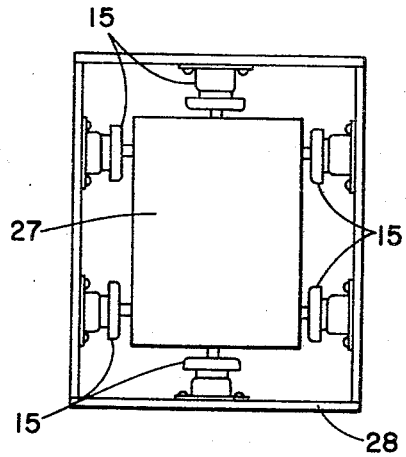
FIGURE 1 is a plan view of an object mounted on a supporting structure and illustrating the manner in which such an object is isolated by a unit embodying the present invention.

Interposed between the top part of the extending portion 13 of casing 10 and cap member 17 is a cushion member 24 that is similar in shape and is made of rubber or rubber-like resilient material. Another cushion member 25 of similar shape and of like material is interposed between the horizontally extending portion 13 of casing 10 and washer 21. Still another compression spring 26 is interposed between the mounting base portion 11 of casing member 10 and cap member 17. An object 27 that is to be isolated and protected against vibration and/or shock is mounted on a suitable base member 28 with an isolator unit 15 interposed therebetween in the manner illustrated in FIGURE 1.

In operation, spring 26 serves as a load supporting spring for object 27 and supports the load of said object without interference from the resilient cushion members 24, 25. If the object 27 is dropped or otherwise subjected to a shock or impact type of loading, spring 26 will be compressed sufficiently so that cap member 17 engages the upper resilient member 24 which then absorbs energy from such shock or impact loading and provides a cushion or cushioning effect. When such shock or impact loading is removed, the action of spring 26 tends to suddenly return the unit to its initial position in which case lower resilient member 25 similarly acts as a cushion to provide a cushioning effect against shock or impact loading in the opposite direction. Once the shock has been dissipated, the lower frequency spring member 26 will function as a vibration isolator.

As noted heretofore, the outer diameter of cylindrical spring 16 is somewhat greater than the diameter of the cylindrical opening 12. Hence, upon the occurrence of relative vertical motion between spring 16 and casing 10, the spring 16 working within central opening 12 creates friction thereby providing damping for the load carrying spring 26. Similarly, and as noted heretofore, spring 23 is pre-loaded, so that when relative horizontal motion occurs between cap 17 and casing member 10, it results in a rubbing action between the end of spring 23 which bears, respectively, against the upper cap member 17 and washer 21, thus providing horizontal damping for load carrying spring 26. As noted above, when the object 27 is subjected to shock or impact loading, the resilient cushions 24, 25 are engaged and deflection thereof occurs in the amount designed for such shock loading. Once the shock or impact loading has been dissipated, the object 27 is again returned to its normal position wherein it is supported mainly by compression spring 26 without interference from the resilient cushions 24, 25.

From the foregoing description, it will be apparent that the device is capable of absorbing shock and/or vibration because of the provision of elements having different natural frequencies. Those elements having higher natural frequencies will absorb shock while those of relatively low natural frequencies will isolate vibration.

Figure 3:
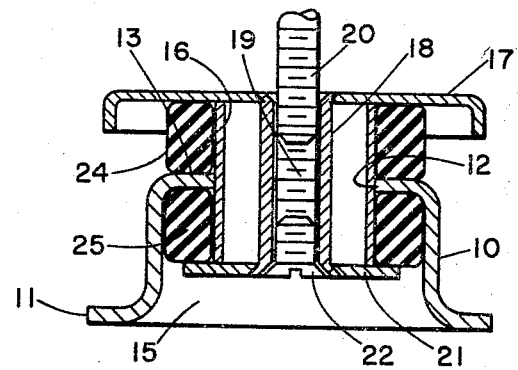
FIGURE 3 is a sectional view similar to that of FIGURE 2 and illustrating a unit that has been modified to render it suitable for the absorption of shock forces only.

In addition, the construction of the device is readily adaptable to various modifications so that through the proper selection and/or elimination of the various elements thereof, a unit may be provided that is designed for a particular purpose only. For example, the modification illustrated in FIGURE 3 is identical with that illustrated in FIGURE 2 except that spring members 23 and 26 have been eliminated. Thus, the principal absorbing elements are resilient members 24, 25 having a high natural frequency so that the device illustrated in FIGURE 3 is intended for use as a shock absorber unit.

Figure 4:
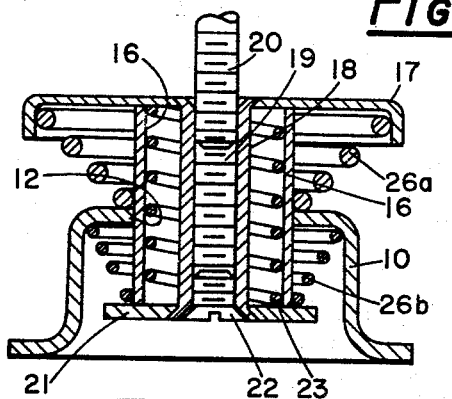
FIGURE 4 is a sectional view, similar to that shown in FIGURE 2, and modified to render such unit suitable for absorbing vibratory forces.

Similarly, the device may be further modified as illustrated in FIGURE 4, to provide a unit that is intended primarily for vibration isolation. The embodiment illustrated in FIGURE 4 is identical to that illustrated in FIGURE 2 except that the resilient members 24, 25 have been eliminated and spring 26 has been replaced by conical springs 26a, 26b. It is to be understood, however, that a single spring 26 between cap member 17 and casing member 10 may be employed if desired. In the embodiment illustrated in FIGURE 4, springs 26a, 26b are load supporting springs with damping provided by cylindrical spring 16 and compression spring 23 as before.

Figure 5:
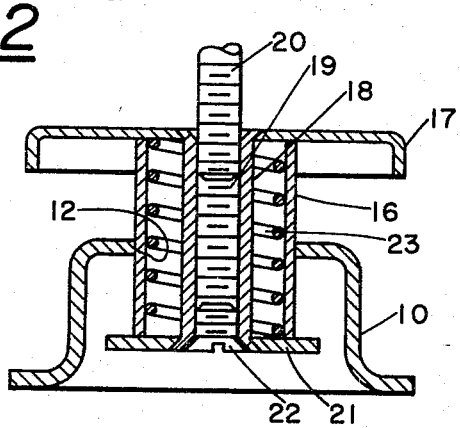
FIGURE 5 is a sectional view, similar to that of FIGURE 2, illustrating a further modification suitable for the provision of a damping only.

FIGURE 5 illustrates a further modification wherein it is desired to provide for damping forces only. The embodiment illustrated in FIGURE 5 is identical to that illustrated in FIGURE 1 except that load supporting spring 26 has been omitted as well as the resilient shock absorbing members 24, 25. Cylindrical spring 16 and compression spring 23 function as before to provide damping force.

While particular embodiments of the invention have been illustrated and described, it will be obvious to those skilled in the art that various changes and modifications may be made without departing from the invention, and it is intended in the appended claims to cover all such changes and modifications that fall within the true spirit and scope of the invention.

What is claimed is:

1. A device of the character described comprising a casing adapted to be connected to a supporting structure and having an end wall defining an opening centrally disposed therein, split cylindrical spring means frictionally disposed within and extending longitudinally through said opening, said split cylindrical spring means being radially pre-biased to exert pressure against the wall of said opening for damping axial vibrations, a second wall disposed over the split cylindrical spring means and exerting axial pressure on one end of said split cylindrical spring means during said axial vibrations and having a depending portion extending therethrough, and a third wall disposed under said split cylindrical spring means and connected to said depending portion for exerting axial pressure on the other end of said split cylindrical spring means during said axial vibrations.

2. A device of the character described comprising
a casing adapted to be connected to a supporting structure and having an end wall defining an opening centrally disposed therein, a cylindrical spring frictionally disposed within and extending through said opening, said cylindrical spring applying spring pressure on said end wall in the plane of said opening,
a second wall having a depending portion extending through said cylindrical spring,
a third wall connected to said portion beyond said cylindrical spring, and a compressional spring disposed within said cylindrical spring and in frictional engagement with and between said second wall and said third wall, said compressional spring applying spring pressure on said second wall and said third wall in a direction orthogonal to the plane of said opening.

3. A device of the character described comprising a casing adapted to be connected to a supporting structure and having an end wall defining an opening centrally disposed therein, metallic cylindrical spring means frictionally disposed within and extending through said opening, a second wall in abutting relation with one end of said spring means and having a depending portion extending centrally therethrough, washer means in abutting relation with the opposite end of said spring means, compression spring means centrally disposed within the cylindrical spring means and in frictional engagement with and between said second wall and said washer means, and means including threaded fastening means connecting the washer means to the depending portion.

4. A device in accordance with claim 2 wherein second compression spring means is disposed between said casing and said second wall.

5. A device in accordance with claim 2 wherein second compression spring means is disposed between said end wall and said second wall, and third compression spring means is disposed between said end wall and the connection between said cylindrical spring means and said connecting means.

6. A device in accordance with claim 3 wherein second compression spring means is disposed between said end wall and said second wall, and third compression spring means is disposed between said end wall and said washer means.

7. A device of the character described comprising a casing adapted to be connected to a supporting structure and having an end wall defining an opening centrally disposed therein, annular resilient members on opposite faces of said end wall and concentrically disposed relative to said opening, split cylindrical spring means frictionally disposed within and extending through said opening, said split cylindrical spring means being radially pre-biased to exert pressure against the wall of said opening for damping axial vibrations, and a second wall having a depending portion extending through said cylindrical spring means and means disposed beyond the split cylindrical spring means and connected to said portion for exerting axial pressure on said split cylindrical spring means during said axial vibrations.

8. A device of the character described comprising
a casing adapted to be connected to a supporting structure and having an end wall defining an opening centrally disposed therein, annular resilient members on opposite faces of said end wall and concentrically disposed relative to said opening,
a cylindrical spring frictionally disposed within and extending through said opening,
a second wall having a depending portion extending through said cylindrical spring,
a flange beyond said cylindrical spring and connected to said portion, and a compressional spring centrally disposed within said cylindrical spring and in frictional engagement with and between said second wall and said flange, said compressional spring applying spring pressure on said second wall and said flange in a direction orthogonal to the plane of said opening.

9. A device in accordance with claim 8 wherein said annular members are of rubber-like material.

10. A device in accordance with claim 8 wherein second compression spring means is interposed between said second wall and said casing.

11. A device in accordance with claim 10 wherein said second spring means is interposed between said second wall and said base.

12. A device in accordance with claim 10 wherein said annular members are of rubber-like material.

13. An isolating unit comprising
a hollow cup-shaped member having a mounting base and an opening in the central portion of the top thereof;
a split, cylindrical sleeve spring within said opening;
a cap member having a downwardly projecting member extending through the central portion of said cylindrical spring, said downwardly projecting member having a hollow central portion and being adapted for threadably engaging a mounting bolt;
a washer secured by a mounting bolt to the lower end of said downwardly projecting member beyond said cylindrical spring;
a first compression spring positioned between the internal surface of said cylindrical spring and the exterior surface of said downwardly projecting member;
a first cushion member interposed between said cup-shaped member and said cap member;
a second cushion member, of similar shape and of like material as the first, interposed between said cup-shaped member and said washer; and
a second compressional spring interposed between the mounting base portion of said cup-shaped member and said cap member.

14. Apparatus comprising
a mounting base with a central opening therein,
a cap member,
a load carrying compressional spring extending from said base to said cap,
and split cylindrical spring means, frictionally disposed in said opening, said split cylindrical spring means being prebiased radially to exert pressure against the wall of said opening for damping axial vibrations of said load carrying spring.

15. Apparatus as defined in claim 14, further including separate shock absorbing means mounted between said cap and said base.

16. Apparatus comprising a mounting base with a central opening therein,
a cap member,
a load carrying compressional spring extending from said base to said cap,
split cylindrical spring means frictionally disposed in said opening, said split cylindrical spring means being radially pre-biased to exert pressure against the wall of said aperture for damping axial vibrations of said load carrying spring,
and a compressional spring mounted within said split cylindrical spring means for damping lateral vibrations of said load carrying spring.

(References on following page)

References Cited

UNITED STATES PATENTS

| | | | |
|---|---|---|---|
| 2,480,487 | 8/1949 | Loepsinger | 248—54 |
| 2,620,178 | 12/1952 | Lehman | 267—9 |
| 2,867,434 | 1/1959 | Johnson | 248—358 |

FOREIGN PATENTS 584,701  1/1947  Great Britain.

CHANCELLOR E. HARRIS, *Primary Examiner.*

CLAUDE A. LE ROY, JOHN PETO, *Examiners.*